United States Patent
Diggs et al.

(10) Patent No.: US 7,962,792 B2
(45) Date of Patent: Jun. 14, 2011

(54) INTERFACE FOR ENABLING A HOST COMPUTER TO RETRIEVE DEVICE MONITOR DATA FROM A SOLID STATE STORAGE SUBSYSTEM

(75) Inventors: Mark S. Diggs, Laguna Hills, CA (US); David E. Merry, Jr., Irvine, CA (US)

(73) Assignee: SiliconSystems, Inc., Aliso Viejo, CA (US)

( * ) Notice: Subject to any disclaimer, the term of this patent is extended or adjusted under 35 U.S.C. 154(b) by 361 days.

(21) Appl. No.: 12/029,370

(22) Filed: Feb. 11, 2008

(65) Prior Publication Data
US 2009/0204853 A1 Aug. 13, 2009

(51) Int. Cl.
*G06F 11/00* (2006.01)
(52) U.S. Cl. ............................................. 714/27; 714/30
(58) Field of Classification Search .................. None
See application file for complete search history.

(56) References Cited

U.S. PATENT DOCUMENTS

| | | | |
|---|---|---|---|
| 4,296,464 A | 10/1981 | Woods et al. | |
| 5,442,768 A | 8/1995 | Sudoh et al. | |
| 5,768,612 A * | 6/1998 | Nelson | 712/32 |
| 5,890,219 A | 3/1999 | Scaringella et al. | |
| 6,000,006 A | 12/1999 | Bruce et al. | |
| 6,269,434 B1 | 7/2001 | Tanaka | |
| 6,401,214 B1 * | 6/2002 | Li | 714/6 |
| 6,434,648 B1 | 8/2002 | Assour et al. | |
| 6,530,034 B1 | 3/2003 | Okada et al. | |
| 6,564,173 B1 * | 5/2003 | Arntz et al. | 702/183 |
| 6,675,281 B1 | 1/2004 | Oh et al. | |
| 6,704,012 B1 | 3/2004 | Lefave | |
| 6,732,221 B2 | 5/2004 | Ban | |
| 6,754,765 B1 | 6/2004 | Chang et al. | |
| 6,761,580 B2 | 7/2004 | Chang | |

(Continued)

FOREIGN PATENT DOCUMENTS
EP 0 589 597 A3 3/1994

OTHER PUBLICATIONS
SFF Committee Specification, "Self-Monitoring, Analysis and Reporting Technology (SMART) SFF-8035i Revision 2.0", Apr. 1, 1996.*

(Continued)

*Primary Examiner* — Gabriel L Chu
(74) *Attorney, Agent, or Firm* — Knobbe, Martens, Olson & Bear, LLP

(57) ABSTRACT

A non-volatile storage subsystem maintains, and makes available to a host system, monitor data reflective of a likelihood of a data error occurring. The monitor data may, for example, include usage statistics and/or sensor data. The storage subsystem transfers the monitor data to the host system over a signal interface that is separate from the signal interface used for standard storage operations. This interface may be implemented using otherwise unused pins/signal lines of a standard connector, such as a CompactFlash or SATA connector. Special hardware may be provided in the storage subsystem and host system for transferring the monitor data over these signal lines, so that the transfers occur with little or no need for host-software intervention. The disclosed design reduces or eliminates the need for host software that uses non-standard or "vendor-specific" commands to retrieve the monitor data.

16 Claims, 13 Drawing Sheets

U.S. PATENT DOCUMENTS

| | | | |
|---|---|---|---|
| 6,892,248 B2 * | 5/2005 | Thayer | 710/2 |
| 6,944,063 B2 | 9/2005 | Chen et al. | |
| 6,976,190 B1 * | 12/2005 | Goldstone | 714/42 |
| 7,079,395 B2 | 7/2006 | Garnett et al. | |
| 7,262,961 B2 | 8/2007 | Motoe et al. | |
| 7,277,978 B2 | 10/2007 | Khatami et al. | |
| 7,447,944 B2 * | 11/2008 | Hu | 714/42 |
| 7,464,306 B1 * | 12/2008 | Furuhjelm et al. | 714/710 |
| 7,694,188 B2 * | 4/2010 | Raghuraman et al. | 714/47 |
| 2002/0138602 A1 | 9/2002 | Vinberg | |
| 2003/0131093 A1 | 7/2003 | Aschen et al. | |
| 2003/0227451 A1 * | 12/2003 | Chang | 345/211 |
| 2004/0228197 A1 | 11/2004 | Mokhlesi | |
| 2004/0260967 A1 * | 12/2004 | Guha et al. | 714/3 |
| 2005/0044454 A1 * | 2/2005 | Moshayedi | 714/54 |
| 2005/0197017 A1 | 9/2005 | Chou et al. | |
| 2005/0268007 A1 | 12/2005 | Nakabayashi | |
| 2005/0281112 A1 | 12/2005 | Ito et al. | |
| 2006/0085670 A1 | 4/2006 | Carver et al. | |
| 2006/0085836 A1 | 4/2006 | Lyons, Jr. et al. | |
| 2006/0095647 A1 | 5/2006 | Battaglia et al. | |
| 2006/0282709 A1 | 12/2006 | Shu et al. | |
| 2007/0008186 A1 | 1/2007 | Michaels et al. | |
| 2007/0053513 A1 | 3/2007 | Hoffberg | |
| 2007/0073944 A1 | 3/2007 | Gormley | |
| 2007/0124130 A1 * | 5/2007 | Brunet et al. | 703/23 |
| 2007/0159710 A1 * | 7/2007 | Lucas et al. | 360/75 |
| 2007/0180328 A1 | 8/2007 | Cornwell et al. | |
| 2007/0260811 A1 | 11/2007 | Merry, Jr. et al. | |
| 2007/0266200 A1 * | 11/2007 | Gorobets et al. | 711/103 |
| 2007/0268791 A1 | 11/2007 | Grow et al. | |
| 2008/0046766 A1 | 2/2008 | Chieu et al. | |
| 2008/0109591 A1 * | 5/2008 | Kim et al. | 711/103 |
| 2009/0037643 A1 * | 2/2009 | Ohtsuka et al. | 711/103 |
| 2009/0063895 A1 * | 3/2009 | Smith | 714/7 |
| 2010/0011260 A1 * | 1/2010 | Nagadomi et al. | 714/704 |

OTHER PUBLICATIONS

International Search Report and Written Opinion in PCT Application No. PCT/US2007/68490; Dated Sep. 29, 2008 in 11 pages.
Office Action dated Jan. 28, 2009 received in related U.S. Appl. No. 11/429,936 in 23 pages.
Webpage printed out from <http://www.m-systems.com/site/en-US/Support/DeveloperZone/Software/LifespanCalc.htm> on Jun. 13, 2006.
Webpage printed out from <http://www.m-systems.com/site/en-US/Technologies/Technology/TrueFFS_Technology.htm> on Jun. 13, 2006.
Webpage printed out from <http://www.techworld.com/storage/features/index.cfm?FeatureID=498> on Jun. 13, 2006.
Document explaining prior sale.
Silicondrive User's Guide, SiSMART Function, Preliminary Version 2.2 Revision A, Feb. 2005.
International Search Report and Written Opinion for International Application No. PCT/US09/32984, mailed on Mar. 17, 2009, in 10 pages.
International Search Report and Written Opinion for International Application No. PCT/US09/33262, mailed on Mar. 25, 2009, in 11 pages.
Office Action dated Jun. 4, 2009 received in related U.S. Appl. No. 11/429,936 in 14 pages.
Notice of Allowance dated Sep. 17, 2009 received in related U.S. Appl. No. 11/429,936 in 25 pages.
Office Action dated Aug. 31, 2010 received in related U.S. Appl. No. 12/688,815 in 25 pages.
Office Action dated Jun. 1, 2010 received in related U.S. Appl. No. 12/027,965 in 45 pages.
Office Action dated Nov. 18, 2010 received in related U.S. Appl. No. 12/027,965 in 11 pages.
Office Action dated Jan. 1, 2011 received in related U.S. Appl. No. 12/688,815 in 25 pages.
Office Action dated Mar. 22, 2011 received in related U.S. Appl. No. 12/027,965 in 12 pages.

* cited by examiner

INTERFACE FOR ENABLING A HOST COMPUTER TO RETRIEVE DEVICE MONITOR DATA FROM A SOLID STATE STORAGE SUBSYSTEM

BACKGROUND

1. Technical Field

The present disclosure relates to an interface for enabling retrieval of device monitor data from a solid state storage subsystem.

2. Description of the Related Art

Rotating hard disk drives (HDD) used, for example, in desktop, laptop, notebook, sub-notebook, tablet and embedded computers support an industry-standard advanced technology attachment (ATA) command called Self Monitoring and Reporting Technology (SMART). The SMART function was designed to act as an "early warning system" for pending problems with mechanical media such as HDDs. The integrated controller on the HDD works in conjunction with various sensors to monitor a variety of different parameters within the HDD, such as mechanical wear of the HDD's spindle motor, to determine if any of the parameters are drifting from a norm that would indicate a possible problem with the HDD.

By contrast with HDDs, solid-state storage subsystems generally do not have moving parts. Thus, many of the parameters monitored by the SMART function used in HDDs are not applicable to solid-state storage subsystems. Solid-state storage subsystems generally include non-volatile storage components that can lose the ability to retain data stored thereon after approximately hundreds of thousands to millions of write/erase cycles.

Generally, non-volatile storage components used in solid-state storage subsystems have a finite number of program/erase cycles (usually specified by component vendors as "endurance") that are recommended or guaranteed for proper data storage and retrieval. The number of such cycles varies by orders of magnitude based on the type of storage component used. Commonly-owned U.S. Patent Application No. 20070260811 A1 entitled "Systems and Methods for Measuring the Useful Life of Solid-State Storage Devices" describes methods and systems that use storage status data to reliably determine or predict when the recommended or guaranteed endurance in a particular non-volatile storage component will be exceeded. In addition, other status data of the solid-state storage such as temperature, operating voltage, etc. can also be important to the determination of the health of the storage subsystem and the prediction of failures.

SUMMARY

A non-volatile storage subsystem is disclosed that maintains, and makes available to a host system, monitor data reflective of a likelihood of a data error occurring. The monitor data may, for example, include usage statistics reflective of the wear of the storage subsystem's a non-volatile memory array, data regarding errors detected by an ECC (Error Correction Code) engine, and/or sensor data reflective of environmental conditions. The storage subsystem transfers the monitor data to the host system over a signal interface that is separate from the signal interface used for standard storage operations. This signal interface may be implemented using otherwise unused pins/signal lines of a standard connector, such as a CompactFlash or SATA connector. Special hardware may be provided in the storage subsystem and host system for transferring the monitor data over these signal lines, so that the transfers occur with little or no need for host-software intervention. The disclosed design (1) reduces or eliminates the need for host software that uses non-standard or "vendor-specific" commands to retrieve the monitor data, and (2) reduces the likelihood that transfers of monitor data will interfere with the performance of ordinary storage operations. Also disclosed is a storage subsystem having an on-board display unit that displays information regarding the monitored conditions.

BRIEF DESCRIPTION OF THE DRAWINGS

These and other features will now be described with reference to the drawings summarized below. These drawings and the associated description are provided to illustrate a preferred embodiment of the invention, and not to limit the scope of the invention.

DETAILED DESCRIPTION OF THE PREFERRED EMBODIMENT(S)

Specific embodiments of the invention will now be described with reference to the drawings. This description is intended to illustrate example implementations of, and applications for, the present invention, and is not intended to be limiting. Nothing in this description is intended to suggest that any particular feature, characteristic, component or step is essential to the invention. The invention is defined only by the claims.

Figure 1:
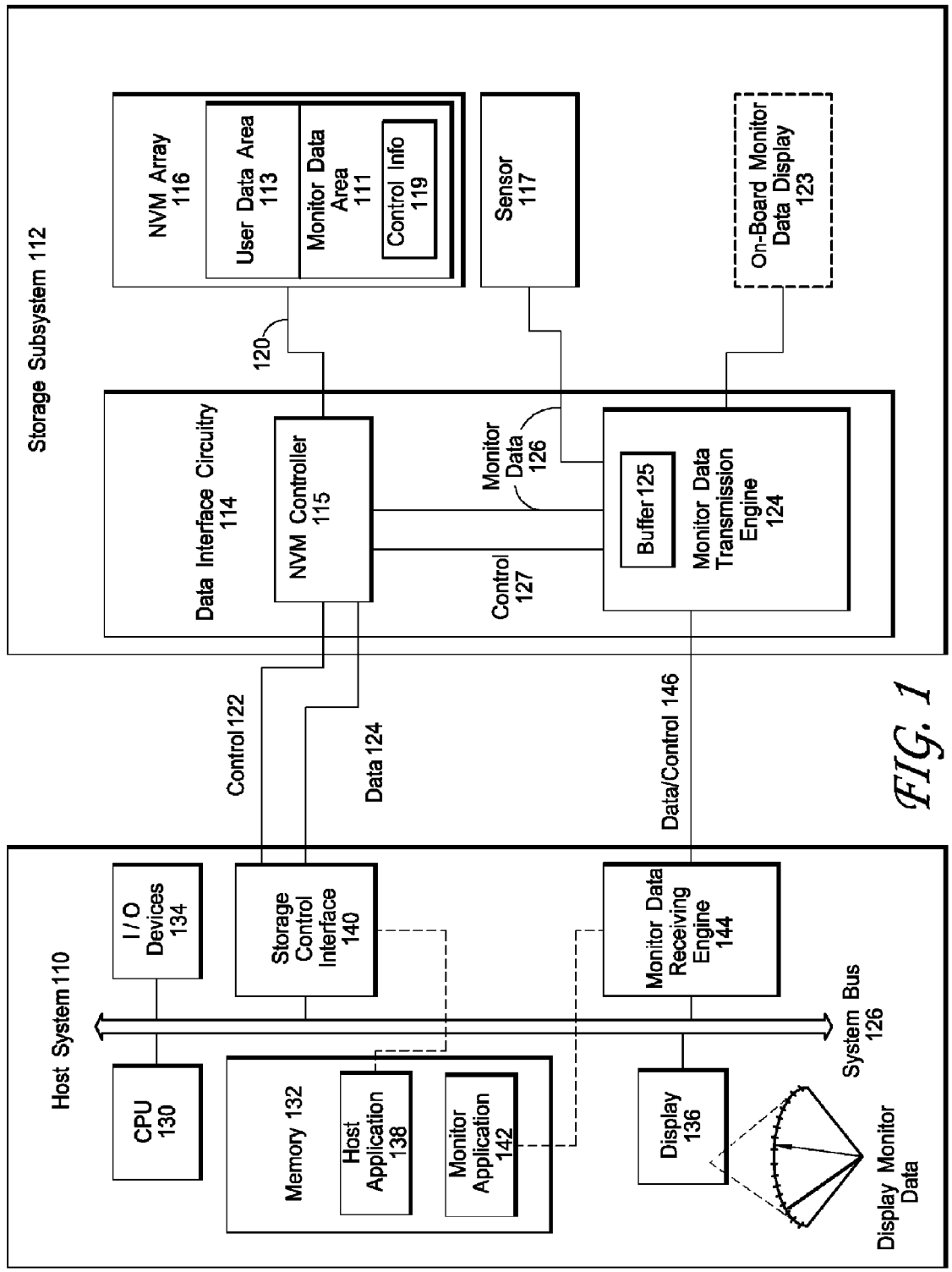
FIG. 1 is a block diagram illustrating a host system and a storage subsystem that include two separate physical interfaces—one for ordinary/standard operations, and one for transferring monitor data.

FIG. 1 is a block diagram illustrating a host system 110 connected to a solid-state storage subsystem 112 according to one embodiment of the invention. The host system 110 comprises a computer that runs application software. For example, the host system 110 may be a personal computer, workstation, router, blade server, a military system, a flight computer or other flight avionics system, a wearable computer used for military applications, a high-speed data recorder, a medical device, an industrial control system, an interactive kiosk, a personal digital assistant, a laptop computer, an interactive wireless communication device, a point-of-sale device, or the like. The host system 110 stores data on the solid-state storage subsystem 112, and may provide operating system functionality and a boot process for the subsystem 112. In one embodiment, the host system 110 executes a host application 138 that provides functionality for communicating with the subsystem 112 via a storage control interface 140, such as by issuing commands in accordance with an Advanced Technology Attachment (ATA) or other storage interface standards.

The host system 110 may be used to implement certain systems and methods described herein. For example, it may be configured to control a storage subsystem and retrieve storage usage information from the storage subsystem. In one embodiment, the host system 110 further comprises a central processing unit (CPU) 130, a memory 132, a connection for a plurality of I/O devices 134, and a display 136. The memory 132 may include random access memory (RAM) for temporary storage of information and a read only memory (ROM) for permanent storage of information. I/O devices may include a keyboard, a mouse or a network connection. In one embodiment, the components or modules of the host system 110 are connected to the system using a standards based system bus 126. In different embodiments, the standards based bus system could be Peripheral Component Interconnect (PCI), Microchannel, Small Computer System Interface (SCSI), Industrial Standard Architecture (ISA) and Extended ISA (EISA) architectures, for example. In addition, the functionality provided for in the components and modules of the host system 110 may be combined into fewer components and modules or further separated into additional components and modules.

In one embodiment, the host system 110 is generally controlled and coordinated by operating system software, such as Windows 95, Windows 98, Windows NT, Windows 2000, Windows XP, Windows Vista, Linux, SunOS, Solaris, or other compatible operating systems. In other embodiments, the host system 110 may be controlled by a proprietary operating system. Conventional operating systems control and schedule computer processes for execution, perform memory management, provide file system, networking, I/O services, and provide a user interface, such as a graphical user interface ("GUI"), among other things.

The solid-state storage subsystem 112 comprises data interface circuitry 114 and a non-volatile memory (NVM) array 116. The NVM array 116 may, but need not, be implemented using NAND memory components. The data interface circuitry 114 further comprises a NVM controller 115 and a monitor data transmission engine 124. The NVM controller 115 is configured to write data to, and read data from, the NVM array 116 in response to commands from the host 110. The storage subsystem 112 may be in the form of a detachable device and may communicate with any standard or unique communications interface, including but not limited to parallel ATA, serial ATA (SATA), IEEE, RS232/423, PCMCIA, USB, Firewire (IEEE-1394), FibreChannel, or PCI Express bus. The storage subsystem 112 may also receive its power from the host 110 over this interface.

In a host-storage subsystem configuration, monitor data is usually routed to the host system along with user data stored in the subsystem. For example, monitor data indicating the status of the storage would be sent, along with user data retrieved from the storage array, on a user data path 124 as part of the routine of a controller on a storage subsystem. However, this leads to extra workload for both the storage subsystem's controller and the host application in addition to the normal read/write operations they must handle. The added load can lead to degraded performance and contention issues.

In contrast, in various embodiments the transmission engine 124 is tasked with sending monitor data to the host system 110 on a monitor data/control path 146 that is separate and distinct from user data path 124. The data/control path 146 is a serial interface in one embodiment and as part of a serial interface in another embodiment. In one embodiment, the transmission engine 124 is configured to receive monitor data 126 that is maintained by the NVM controller 115. In another embodiment, the monitor data 126 is supplied to the transmission engine 124 by sensor 117. This approach eliminates the need for special vendor-specific commands for retrieving the monitor data and thus simplifies the design of the host software.

In one embodiment, the monitor data 126 includes data related to usage statistics. The monitor data 126 may additionally or alternatively include a variety of status data such as temperature, humidity, altitude, shock, bit error rate/statistics, power-on time, power threshold, endurance and other such data that indicate the current status of the solid-state storages in the NVM array 116. Examples of specific types of monitor data that may be maintained are described in Published U.S. Patent Application No. 20070260811, published Nov. 8, 2007, entitled "Systems and Method for Measuring the Useful Life of Solid-State Storage Devices," and in U.S. patent application Ser. No. 12/027,965, filed Feb. 7, 2008, entitled "Solid State Storage Subsystem that Maintains and Provides Access to Data Reflective of a Failure Risk," the disclosures of which are hereby fully incorporated by reference.

Processing of Monitor Data

The transmission engine 124 and the receiving engine 144 are preferably implemented in hardware as a state machine circuitry. For example, these engines 124 and 144 may be implemented in Application-Specific Integrated Circuits (ASICs) or Field Programmable Gate Arrays (FPGAs). In one embodiment, the transmission engine 124 is implemented as a separate component apart from the NVM controller 115, although the two may alternatively be integrated within a single chip. In operation, the NVM controller 115 is configured to forward monitor data, including NVM usage statistics, to the transmission engine 124. In one embodiment, the NVM controller 115 is configured to forward such data only during its own idle times. For example, the NVM controller may forward this data only when it is not actively reading from or writing to the NVM array 116 or otherwise processing host commands. The transmission engine 124 may receive additional monitor data such as temperature and voltage data from one or more sensors 117 as well. In one embodiment, the monitor data is stored in a buffer 125, which enables the NVM controller 115 and the sensors 117 to output monitor data according to a schedule that is different from the times at which the transmission engine 124 sends monitor data to the host system 110.

In turn, the transmission engine 124 prepares the monitor data for transmission to the host system 110. In one embodiment, the monitor data is transmitted as a continuous data stream while in another embodiment it is transmitted as requested by the host system 110 or according to a schedule set by the host system. A corresponding monitor data receiving engine 144 residing in the host system 110 is configured to interact with the transmission engine 124 and receive the monitor data. At the software level, a monitor application 142 running in memory 132 interprets the monitor data received by the receiving engine 144 (as indicated by the dotted line connecting the two components). In one embodiment, the monitor application 142 also generates a visual representation of the monitor data on the display 136. Preferably, control information required for transmission (e.g. baud rate, parity bit, etc) can be transmitted once from the host system 110 to the storage subsystem 112, for example, as part of a power-up sequence. The information is then stored in a control information area 119 of the NVM Array 116. The host system 110 can thus receive monitor data from the storage subsystem 112 without further exchange of such information.

In one embodiment, the receiving engine 144 is also configured to send custom commands to the transmission engine 124 via a data/control path 146, which is a serial interface in one embodiment. For example, the receiving engine 144 can issue a command to instruct the transmission engine 124 on the frequency of monitor data updates. Sample commands include power-up sequence commands, commands to reset monitor data (e.g. when a user wishes to monitor statistics during a critical mission), and commands to instruct the storage subsystem to send only a subset of the available monitor data (e.g. if a user only wants to receive the usage data). In another embodiment, the transmission engine 144 is configured to relay some of the same commands via a control path 127 to the NVM controller 115.

The sending and receiving of monitor data via the data/control path 146, a path that is separate and distinct from the user data path 124, reduces controller overhead and contention issues. In particular, under this configuration the host application 138 no longer needs to be burdened with the task of receiving and parsing monitor data. Because monitor data can be acquired without interruption of the host application 138, embodiments provide reduced controller overhead and effectively increase the performance of the storage subsystem. Furthermore, the isolation of the monitoring function from the main user data path saves cost and time on software integration efforts, as it eliminates the need for the host to send vendor-specific commands to the storage subsystem. Finally, isolating monitor data also reduces host system crashes caused by conflicts between the monitoring function and the data storage/retrieval function.

Embodiments of Monitor Data Transmission and Receiving Engines

Figure 2A:
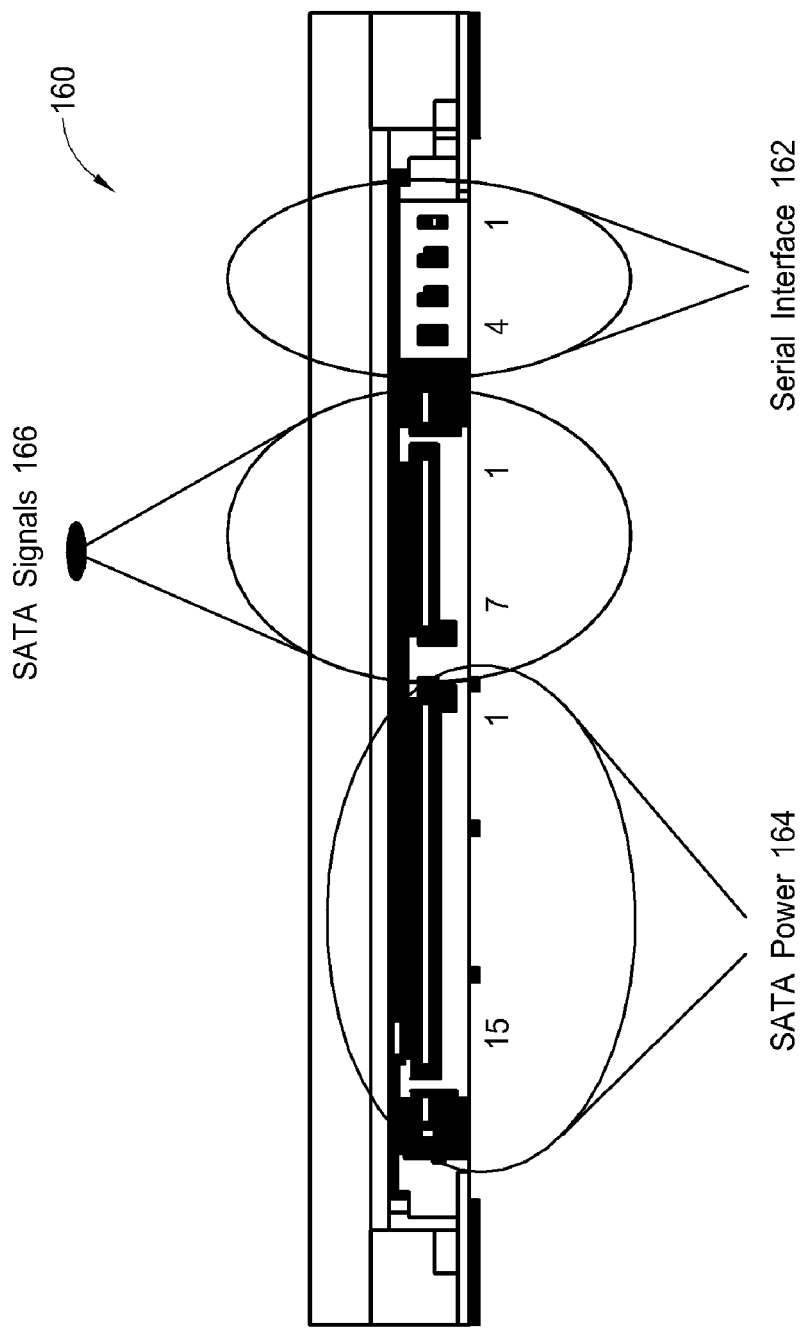
FIG. 2A illustrates the connector portion of a storage subsystem with a Serial Advanced Technology Attachment (SATA) interface according to one embodiment and identifies as a set of SATA signal lines/pins that can be used to implement the interface for transferring monitor data.

FIG. 2A is a side view of a SATA based embodiment. A SATA storage subsystem 160 comprises several connectors, a SATA Power connector 164, a SATA signals interface 166 and a serial interface 162. In one embodiment, user data that is stored in the storage subsystem 160 is transmitted to a host system via the SATA signals interface 166, while monitor data is transmitted to a host system via the serial interface 162. In a typical SATA configuration, the 4 pins/signal lines 162 are commonly left unused except for firmware update and initialization. Some embodiments of the invention take advantage of these unused pins and utilize them to transmit monitor data and optionally, to transfer custom commands to the software. Thus, for example, the transmission engine 124 (not shown in FIG. 2A) in the SATA subsystem 160 would send monitor data to the receiving engine 144 on the host system 110.

Figure 2B:
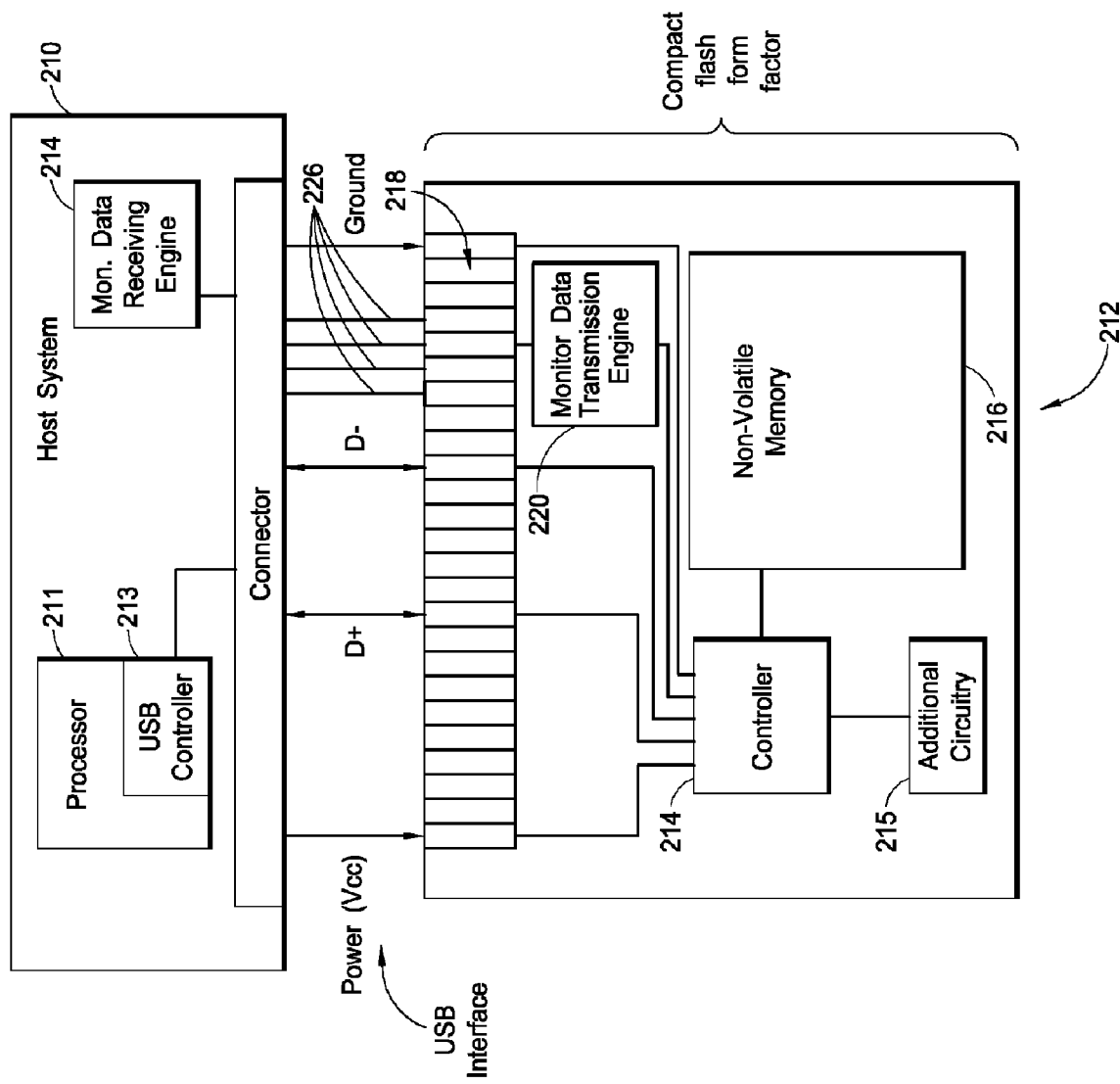
FIG. 2B is a block diagram illustrating one embodiment with an USB interface implemented in the CompactFlash (CF) form factor.

FIG. 2B shows a USB storage subsystem 212 according to another embodiment of the invention. In this embodiment, a USB controller 214, a non-volatile memory (NVM) 216, and additional circuitry 215 are mounted to a card or substrate that partially or fully complies with a standard CompactFlash (CF) form factor. The subsystem's connector 218 is a standard CF connector, although only a small subset of the connector's electrical contacts are actually used. The storage subsystem 212 may, but need not, include a case or housing that houses the various active components. The storage subsystem 212 may, for example, plug into a CF connector mounted to the host system's motherboard such that the storage system is perpendicular to the motherboard.

Additional circuitry 215 may provide additional functionality that allows for greater control, security, and reliability of the embedded USB storage subsystem 212. For example, additional circuitry 215 may provide for the protection of data stored in the NVM 216 from corruption when interruptions or other irregularities occur in a power signal line supplied by the host system 210, such as described in U.S. Pat. No. 6,856,556, entitled "Storage Subsystem with Embedded Circuit for Protecting against Anomalies in Power Signal from Host."

Traditional CF cards use an IDE interface and are therefore configured with an IDE compatible connection. Thus, the physical connector 218 of storage subsystem 212 may have 40 or more available positions (typically 50). However, in the embodiment shown, the storage subsystem 212 uses a USB signal interface and therefore requires as few as four available positions to be active. The four active positions shown comprise a ground line, a power line (VCC), a D+ signal line, and a corresponding D− signal line. This still leaves many positions available for signal lines between a monitor data transmission engine 220 and a monitor data receiving engine 214. Therefore, a subset 226 of these signal lines, as shown in FIG. 2B, can be used by the monitor data transmission and receiving engines to transmit monitor data. In this particular example, four signal lines are used to implement the special interface for the transferring monitor data; however, a greater or lesser number of signal lines may be used. Embodiments thus take advantage of the available pins in a CF form factor in an USB implementation and transmit monitor data over those available pins.

Figure 2C:
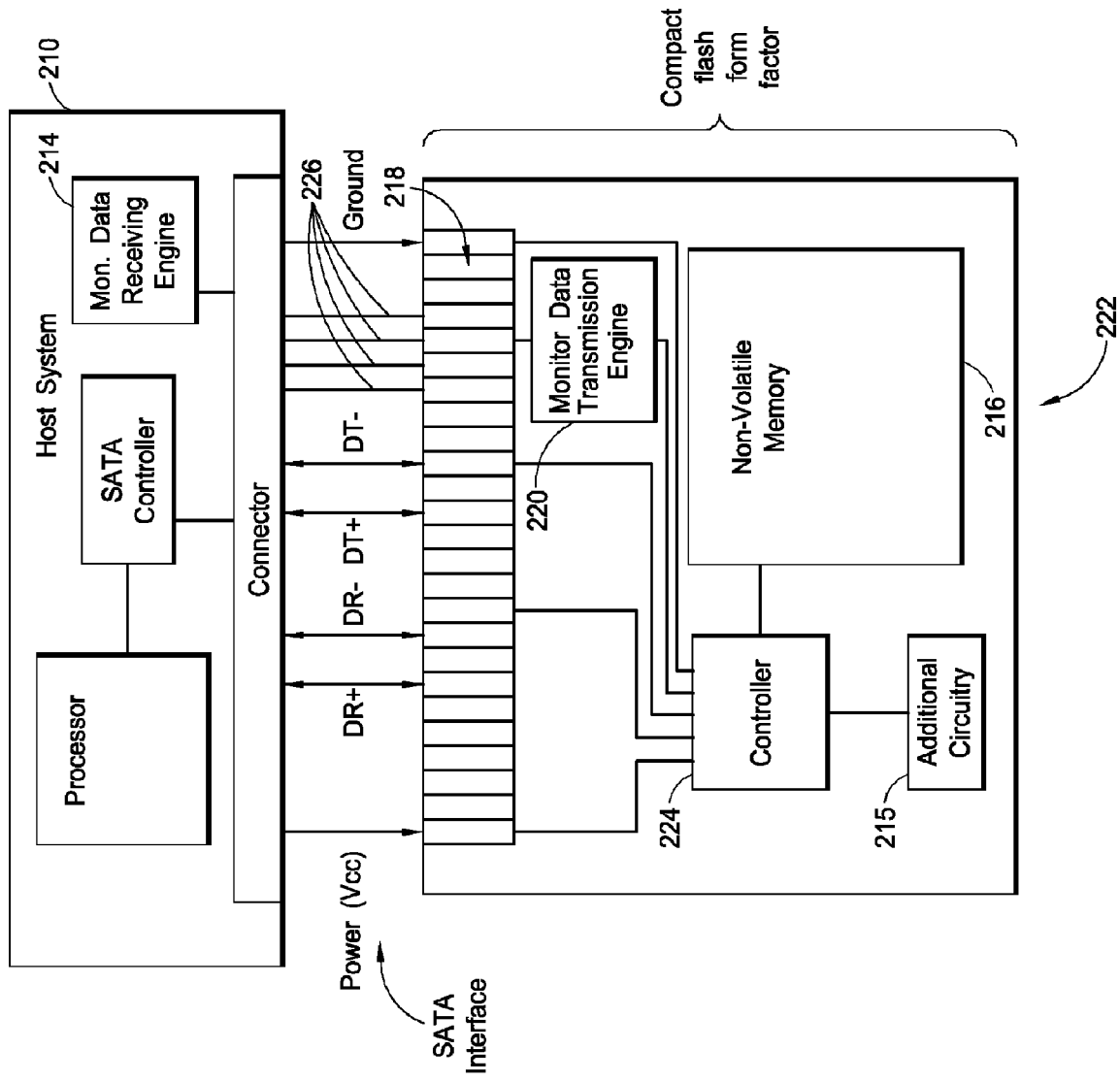
FIG. 2C is a block diagram illustrating one embodiment with a SATA interface implemented in the CF form factor.

FIG. 2C shows a CF embodiment with a serial ATA (SATA) interface. In this embodiment, a storage subsystem 222 comprises a serial ATA controller 224 connected to a NVM array 216. The serial ATA controller 224 is capable of receiving data and control signals from a host system via electrical connectors 218, as well as reading data from and writing data to the NVM array 216 in response to those signals. The storage subsystem 222 further comprises additional circuitry 215 which may allow for additional functionality as described previously.

As illustrated in FIG. 2C, the storage subsystem 222 plugs into a CF connector of the host system 210 such that the storage subsystem is embedded within the host system. This connector may, for example, be mounted to the host system's motherboard such that the storage subsystem is perpendicular to the motherboard. In this particular embodiment of FIG. 2C, the host system's processor and a SATA controller are separate devices; in other embodiments, the SATA controller may be integrated into the processor.

The SATA signal interface provides many of the same benefits as the USB signal interface. The serial ATA standard uses seven signal lines, of which four are active data lines. For example, one position is used for a power line (VCC), two positions are used for ground lines, and the remaining positions are used for DR+, DR−, DT+, and DT− data signal lines. When used over a CF physical connector, which has 50 positions, only a handful of these positions need to be actively wired on the host system circuit board. For example, in the embodiment shown, only seven positions are used. Therefore, a subset 226 of these signal lines, as shown in FIG. 2C, can be used by a monitor data transmission engine 220 and a monitor data receiving engine 214 to transmit monitor data. Embodiments thus take advantage of the available pins in a CF form factor in an SATA implementation and transmit monitor data over those available pins.

Embodiments have been described utilizing USB and SATA signal interfaces. However, in other embodiments, other signal interfaces may be used with systems having various form factors as described previously. For example, a storage subsystem may utilize SD, microSD, MMC, or RSMMC signal interfaces. Many of the advantages discussed with respect to the USB and SATA signal interfaces may be recognized with these and other signal interfaces.

Figure 3:
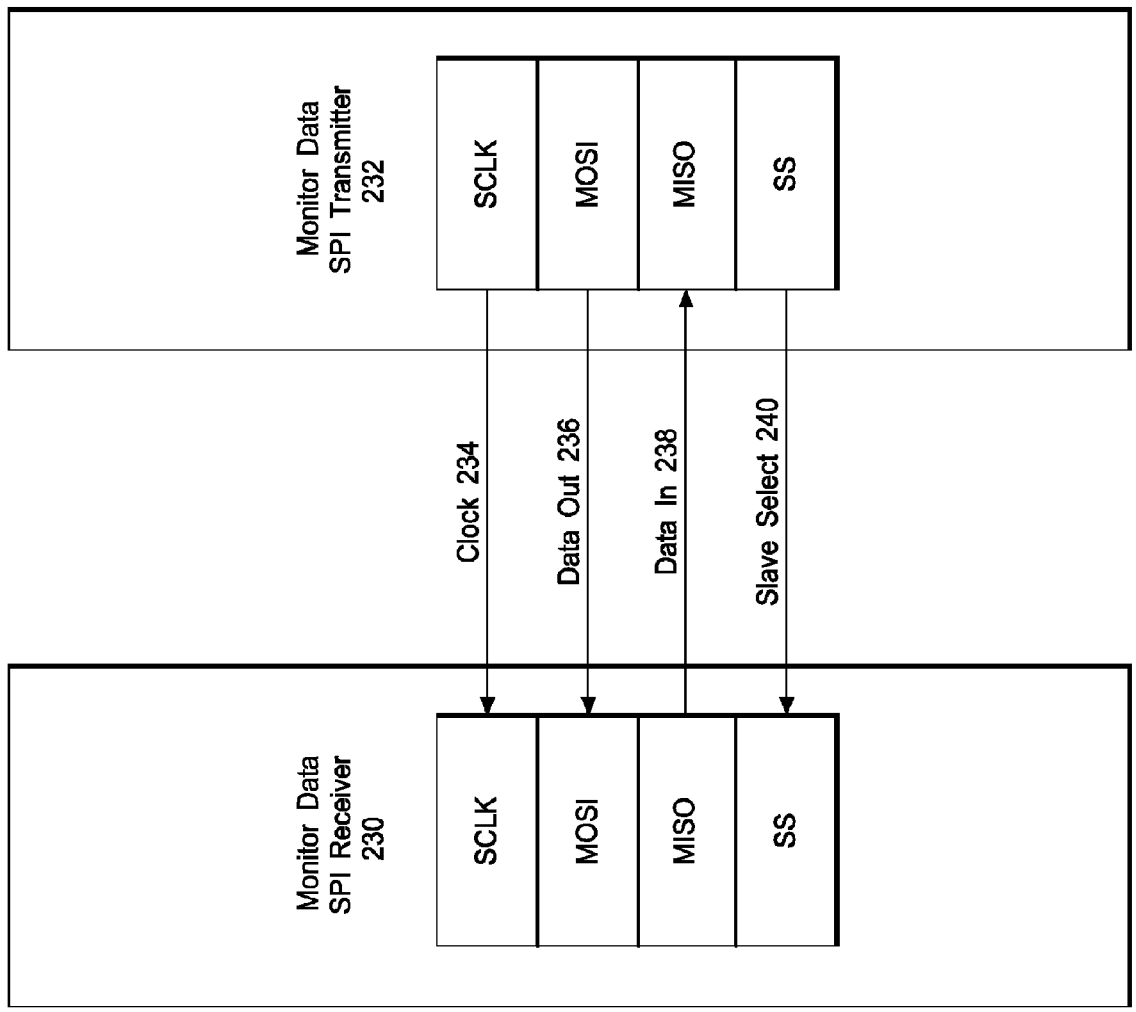
FIG. 3 is a block diagram illustrating a monitor data transmission engine and a monitor data receiving engine according to one embodiment.
Figure 4:
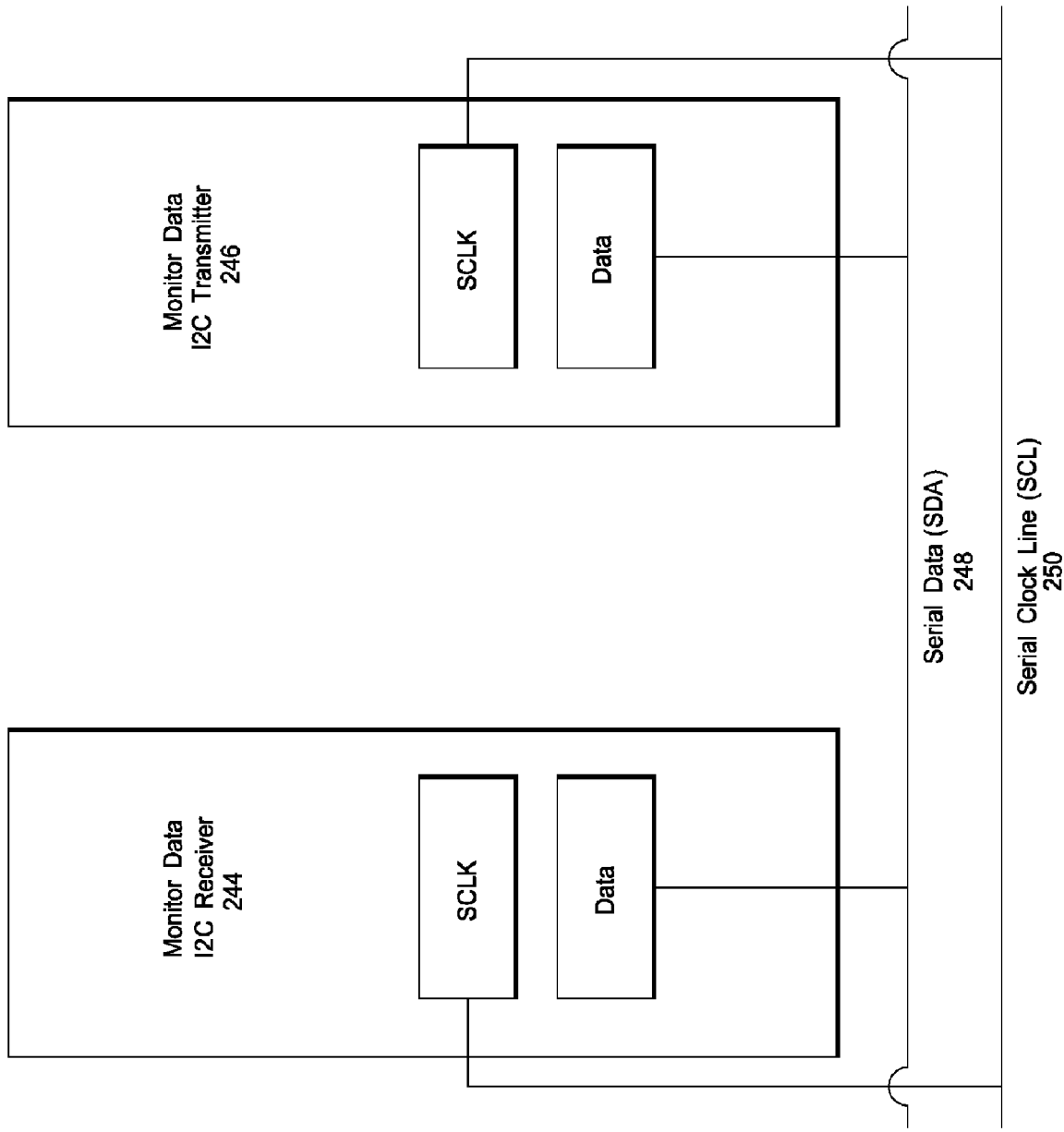
FIG. 4 is a block diagram illustrating a monitor data transmission engine and a monitor data receiving engine according to another embodiment.
Figure 5:
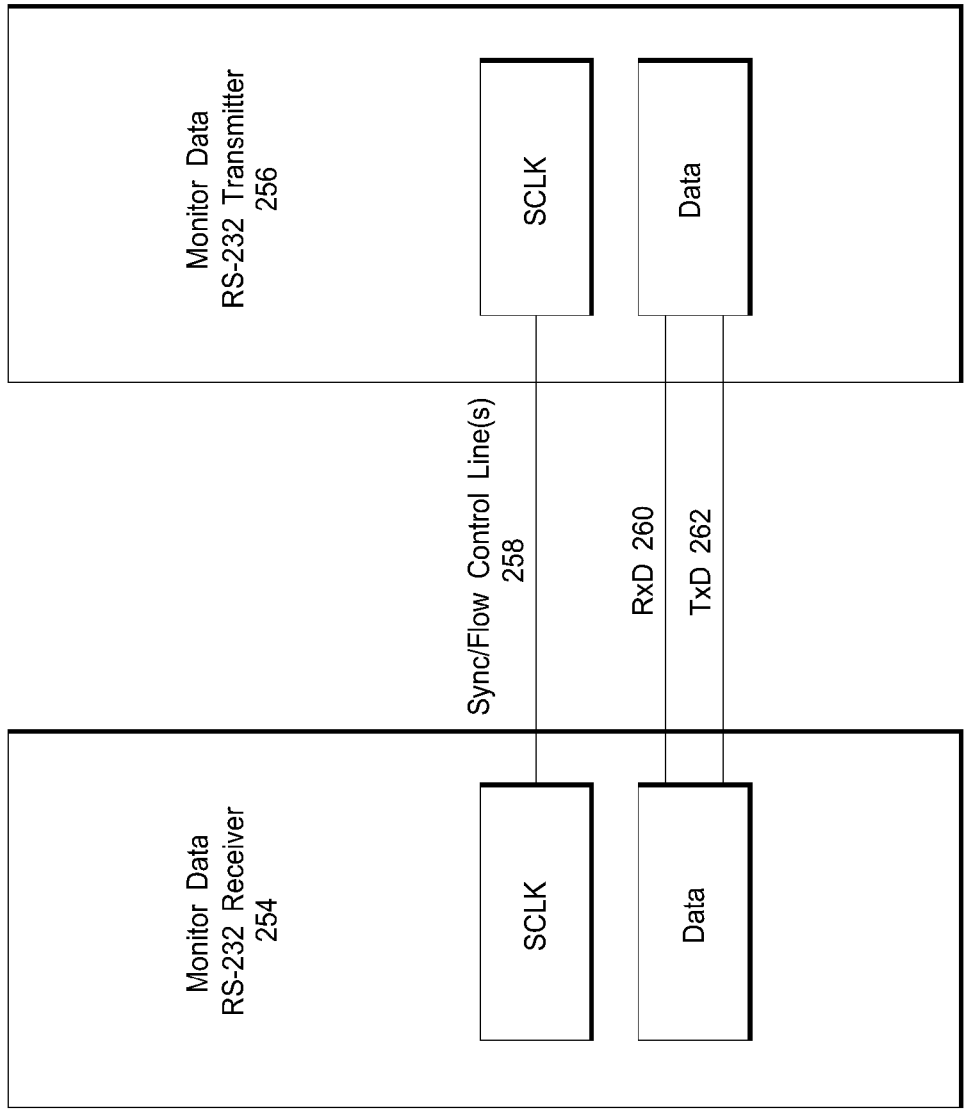
FIG. 5 is a block diagram illustrating a monitor data transmission engine and a monitor data receiving engine according to yet another embodiment.

FIGS. 3-5 show monitor data transmission and receiving engines according to various embodiments of the invention. In one embodiment, the transmission engine 124 comprises a serializing engine implemented in these example interfaces: Inter-Integrated Circuit ($I^2C$), Serial Peripheral Interface (SPI), System Management Bus (SMBUS), Access.BUS, RS-232, etc. In another embodiment, the transmission engine 124 is dedicated to serializing and outputting monitor data, while the receiving engine 144 in the host system 110 comprises a corresponding deserializing engine that can decode this serial stream into a pre-defined block of data comprising monitor data.

FIG. 3 is a block diagram illustrating a monitor data transmission engine and a monitor data receiving engine according to a SPI based embodiment. In this embodiment, the master resides in a SPI transmitter 232 while the slave resides in a SPI receiver 230. The master-slave interface comprises a clock signal line 234, a data out line 236, a data in line 238, and a slave select line 240. Monitor data is transmitted from the SPI transmitter 232 to the SPI receiver 230 in accordance to the SPI specification. As SPI is a serial data stream, the SPI receiver parses the data into bytes. A processor is needed (e.g. on the host) to sync the data so that it can be interpreted properly. This can be accomplished by sending sync bytes, etc. Both the host and the storage subsystem can thus interpret custom commands or monitor data.

FIG. 4 is a block diagram illustrating a monitor data transmission engine and a monitor data receiving engine according to an $I^2C$ based embodiment. In one embodiment, an $I^2C$ transmitter 246 transmits monitor data to an $I^2C$ receiver 244. In one embodiment, the interface comprises a serial clock line 250 and a serial data line 248. In one embodiment, monitor data is transmitted from the $I^2C$ transmitter 246 to the $I^2C$ receiver 244 in accordance to the $I^2C$ specification. In another embodiment, the transmitter and receiver are implemented in SMBUS, Access.BUS, or other protocols similar to the $I^2C$ specification.

FIG. 5 is a block diagram illustrating a monitor data transmission engine and a monitor data receiving engine according to a RS-232 based embodiment. This embodiment takes advantage of the common availability of the RS-232 port found in many host systems. In this embodiment, monitor data is transferred from a RS-232 transmitter 256 residing in the storage sub-system to a RS-232 receiver 254 residing in the host system. The interface comprises a plurality of sync/flow control lines 258, and two data lines, namely a receiving line 260 (RxD line) and a transmitting line 262 (TxD). The host system 110 uses information as to the port baud rate, number of data bits, even or odd parity, etc. to read the data correctly. In one embodiment, the host system 110 transmits such control information to the storage subsystem 112 in advance and stores it in the control information area 119 within the NVM Array 116. The host system 110 and the storage subsystem 112 can exchange monitor data based with the stored configuration without any additional exchange of control information.

Monitor Data Format

Figure 6:
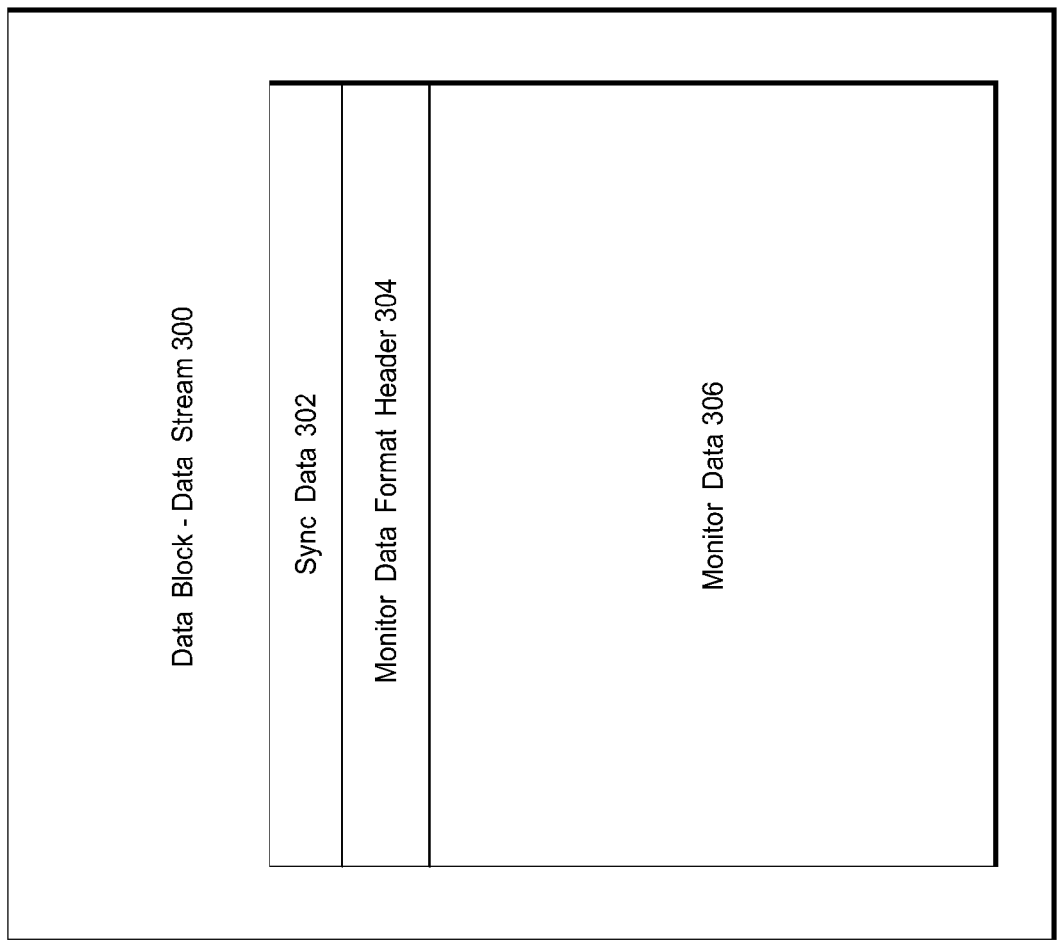
FIG. 6 is a schematic of a monitor data block format according to one embodiment.

FIG. 6 shows the format of the monitor data block according to one embodiment. In one embodiment, the monitor data transmission engine 124 encodes monitor data according to the format shown in FIG. 6 and the monitor data receiving engine 144 decodes the data according to the same format. As shown, data block—data stream 300 comprises sync data 302, a monitor data format header 304 and monitor data 306. In various embodiments, sync data 302 will enable the transmission engine 124 and the receiving engine 144 to synchronize the transfer of monitor data, and the monitor data format header 304 will set forth the format in which monitor data 306 is transferred. Because the amount and type of monitor data will differ among the embodiments, the monitor data format header 304 may vary depending on the type of monitor data that is being used. For example, in some embodiments, monitor data will include readings from the sensor 117 such as temperature and voltage while in other embodiments monitor data will include primarily usage statistics data generated by the NVM controller 115. The header 304 will specify what type of monitor data is being transferred and the locations within the data block where various monitor data are transferred.

Operation of Monitor Data Transmission and Receiving Engines

Figure 7:
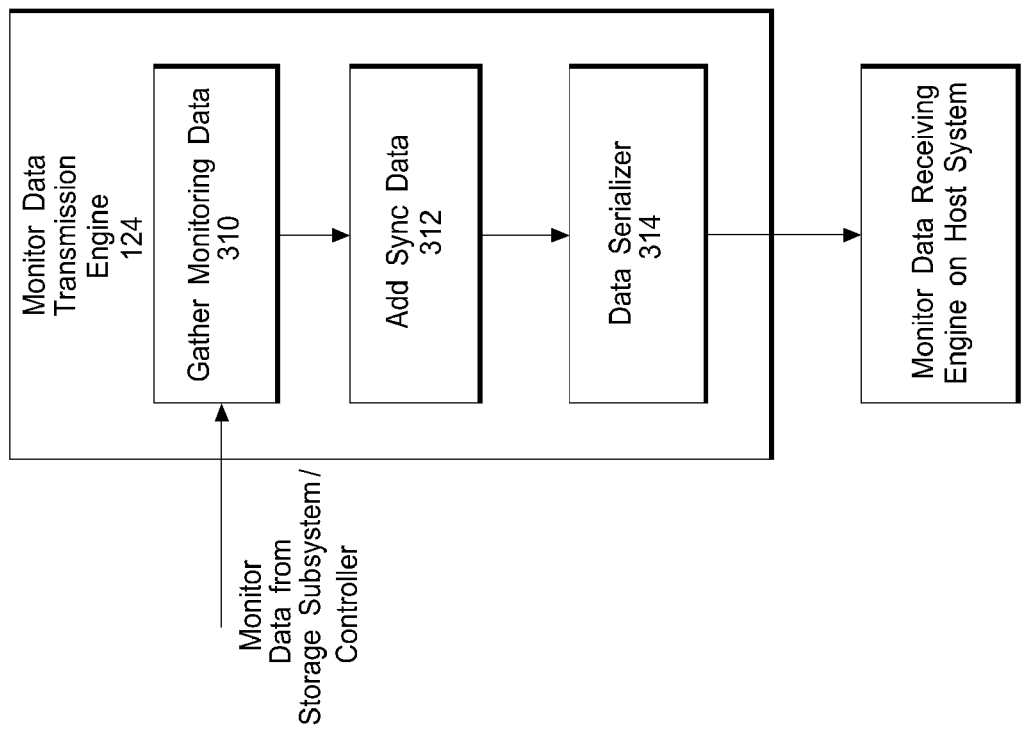
FIG. 7 illustrates a process the monitor data transmission engine undertakes to send monitor data according to one embodiment.

FIG. 7 is a block diagram showing the operation of the monitor data transmission engine 124 according to one embodiment. The operation begins at step 310, where monitor data is gathered from the NVM controller 115 and/or the sensor 117. In another embodiment, monitor data is retrieved from the buffer 125. At step 312, sync data is added onto monitor data. Then at step 314 a data serializer serializes the data and sends the data to the monitor data receiving engine 144. In one embodiment, the operation is executed in accordance to the control information 119 stored in the NVM Array 116.

Figure 8:
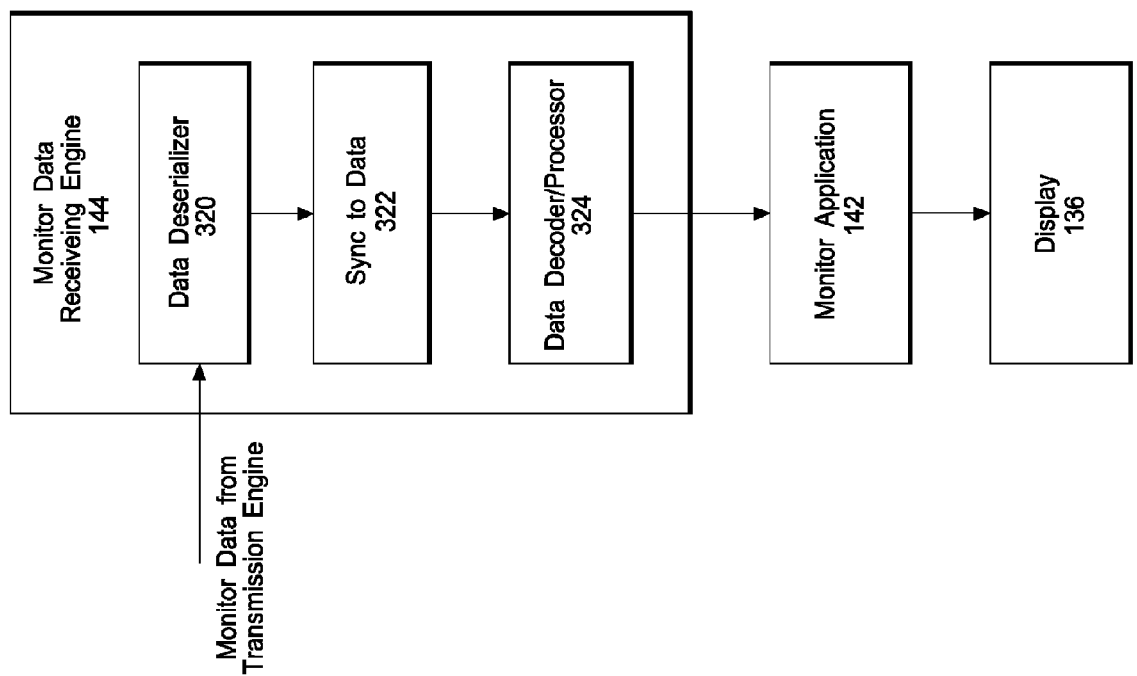
FIG. 8 illustrates a process the monitor data receiving engine undertakes to receive monitor data according to one embodiment.

FIG. 8 is a block diagram showing the operation of the monitor data receiving engine 144 according to one embodiment. The operation begins at step 320, where serialized monitor data is received from the monitor data transmission engine 124 residing in the storage subsystem 112, and a data serializer deserializes the incoming monitor data. At step 322, the monitor data receiving engine 144 synchronizes with the incoming data. At step 324 the incoming data is decoded according to the format information embedded in the header 304 (example shown in FIG. 6). At this step any addition processing of data such as putting the data in memory is performed. Then the monitor data is sent to or accessed by the monitor application 142, which further processes the data. The monitor application may periodically read an RS-232 port, for example. In one embodiment, monitor data is averaged and aggregated into reports. The monitor data may additionally or alternatively be forwarded to the host application 138, which may, for example, use this data to modify the patterns of write and read operations. In yet another embodiment, monitor data is sent to the display 136 as to show the user of the system the current status of the NVM array. The monitor application may also be a warning indicator to the host or alert the host in the event that: (1) the storage subsystem needs to be replaced and (2) the environmental conditions are extreme. In other words, besides sending the information to the display 136, the monitor application itself can process the monitor data and perform various monitor or maintenance functions as needed.

Example User Interface/Display

Figure 9A:
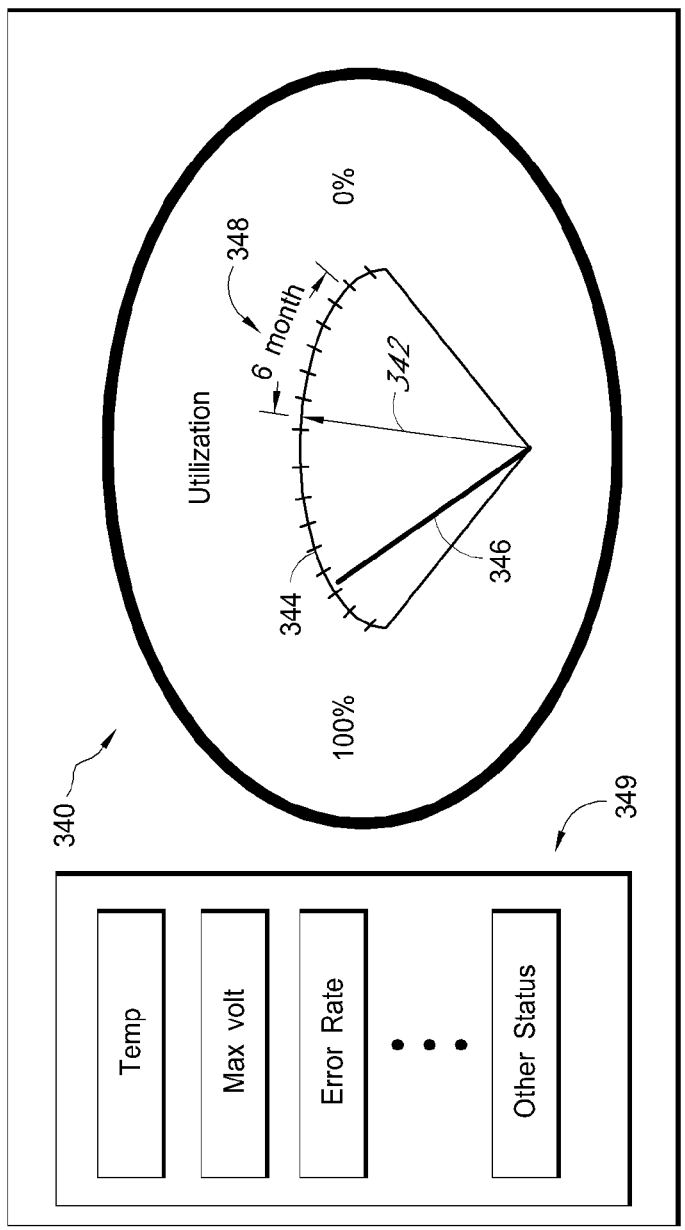
FIGS. 9A and 9B illustrate example displays that may be generated by the host system based on the received monitor data.

FIG. 9A illustrates one example of a display 340 that may be generated by the monitor application 142 to indicate the current monitor data, including the amount of useful life remaining in the solid-state storage subsystem 112. In this example, a pointer 342 in the display 340 indicates the wear state or "utilization" of the NVM array 116 relative to a percentage scale 344. If the pointer 342 points to 0%, for example, substantially all of the specified endurance or number of program/erase cycles recommended or guaranteed for the NVM array 116 remain. If, however, the pointer 342 points to 100%, the specified endurance of the NVM array 116 has been reached and the probability of a failure is very high.

As shown in FIG. 9A, the display 340 in this example also includes a threshold indicator 346 displayed relative to the percentage scale 344 so as to indicate an upper limit or threshold set by the host system 110 or a user. The threshold is advantageously set below a specified data endurance or wear level so as to reduce the probability of a failure. In one embodiment, a warning signal is provided once the pointer 342 reaches the threshold indicator 346. The NVM driver 115 may prevent the host system 110 from performing additional write operations to the subsystem 112 once this or some other threshold has been reached.

In the example shown in FIG. 9A, the time indicator 348 is a sliding time window of six months starting from a current time corresponding to a current location of the pointer 342 and extending back in time for six months. Thus, by observing the percentage of available program/erase cycles used during the past six months, for example, the host system 110 or user can predict when the pointer 342 will reach the threshold indicator 346 and/or the specified endurance limit (e.g., 100%) and display or otherwise output this prediction to a user. Various other types of time indicators can be used. For example, in another embodiment, the time indicator 348 starts at 0% and ends at the pointer 302 while incrementing the displayed time (e.g., 1 day, 2 weeks, 4 months, etc.).

In addition to the meter displaying useful life remaining, in other embodiments monitor application 142 may display other monitor data 349 such as temperature, operating voltage, etc. as shown in FIG. 9A. As such, the user can monitor the current status of the storage sub-system and take appropriate actions in necessary.

Figure 9B:

Other types of displays may also be used, such as the status bar shown in FIG. 9B. The status bar 350 grows as the percentage of specified endurance for the NVM array 116 is used. As shown in FIG. 9B, in certain such embodiments, the status bar 350 includes a displayed percentage 352 of specified endurance used. In other embodiments, the percentage is displayed as a scale along the length of the status bar 350.

In some embodiments, the storage subsystem 112 may itself be configured to display information about its current wear state. For example, the storage subsystem may include a small LCD or other display that generates a gauge image similar to that shown in FIG. 9B, or which displays a value or symbol reflective of the wear level, data endurance or life expectancy of the device. In such embodiments, the ability for the host 110 to read the stored usage data may optionally be omitted.

Calculation of Endurance-Based Remaining Life

In accordance with one embodiment, the process for determining the endurance-based remaining life of a solid-state storage subsystem 112 may be performed solely by the NVM controller 115 in response to a command or command sequence from the host, or may be performed partially by the controller 115 and partially by the driver/host. In another embodiment, the process may be performed by the transmission engine 124. An example process for determining the endurance-based remaining life is further described in commonly-owned U.S. patent application No. 20070260811, published Nov. 8, 2007, entitled "Systems and Methods for Measuring the Useful Life of Solid-state Storage Devices", the disclosure of which is hereby fully incorporated by reference.

Additionally, embodiments of the present invention can accommodate a wide variety physical or logical data structures within the solid-state storage subsystems. An example data structure is described in the U.S. patent application entitled "Systems and Methods for Measuring the Useful Life of Solid-state Storage Devices" referenced above.

Alternate Embodiments of Data Monitoring

The various embodiments discussed above serve as illustrative examples only. A number of alternate embodiments can be implemented. For example, the host system 110 can be an embedded system that comprises the storage subsystem 112. In addition, those skilled in the art will recognize that the monitor data transmission engine 124 and the monitor data receiving engine 144 can be implemented in various parallel protocols as well.

Figure 10:
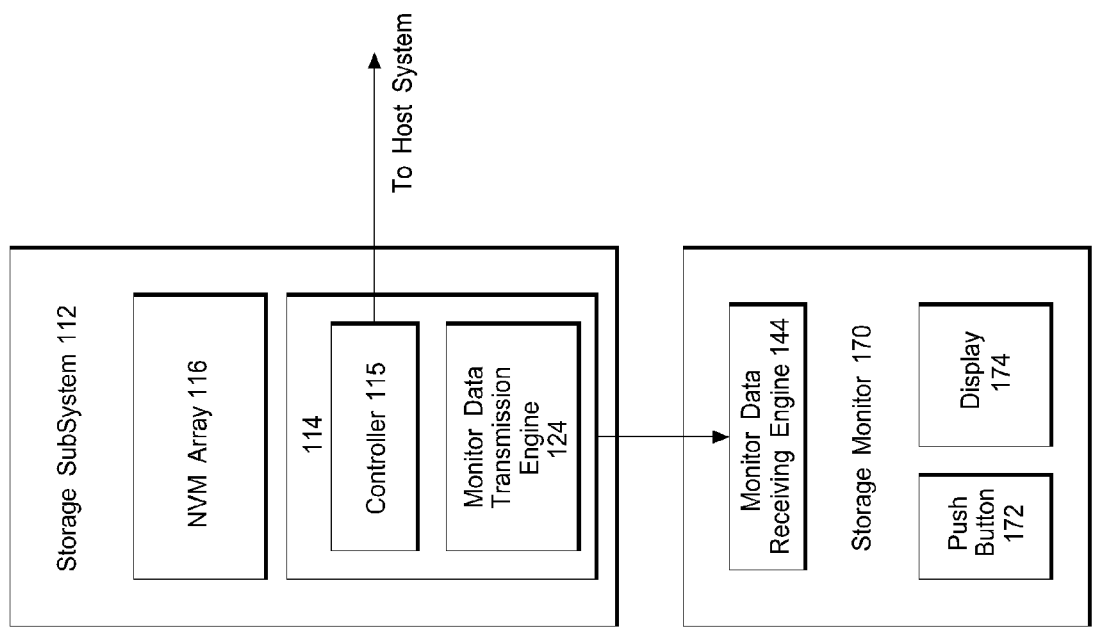
FIG. 10 is a block diagram illustrating a storage subsystem and a storage monitor unit according to one embodiment.
Figure 11:
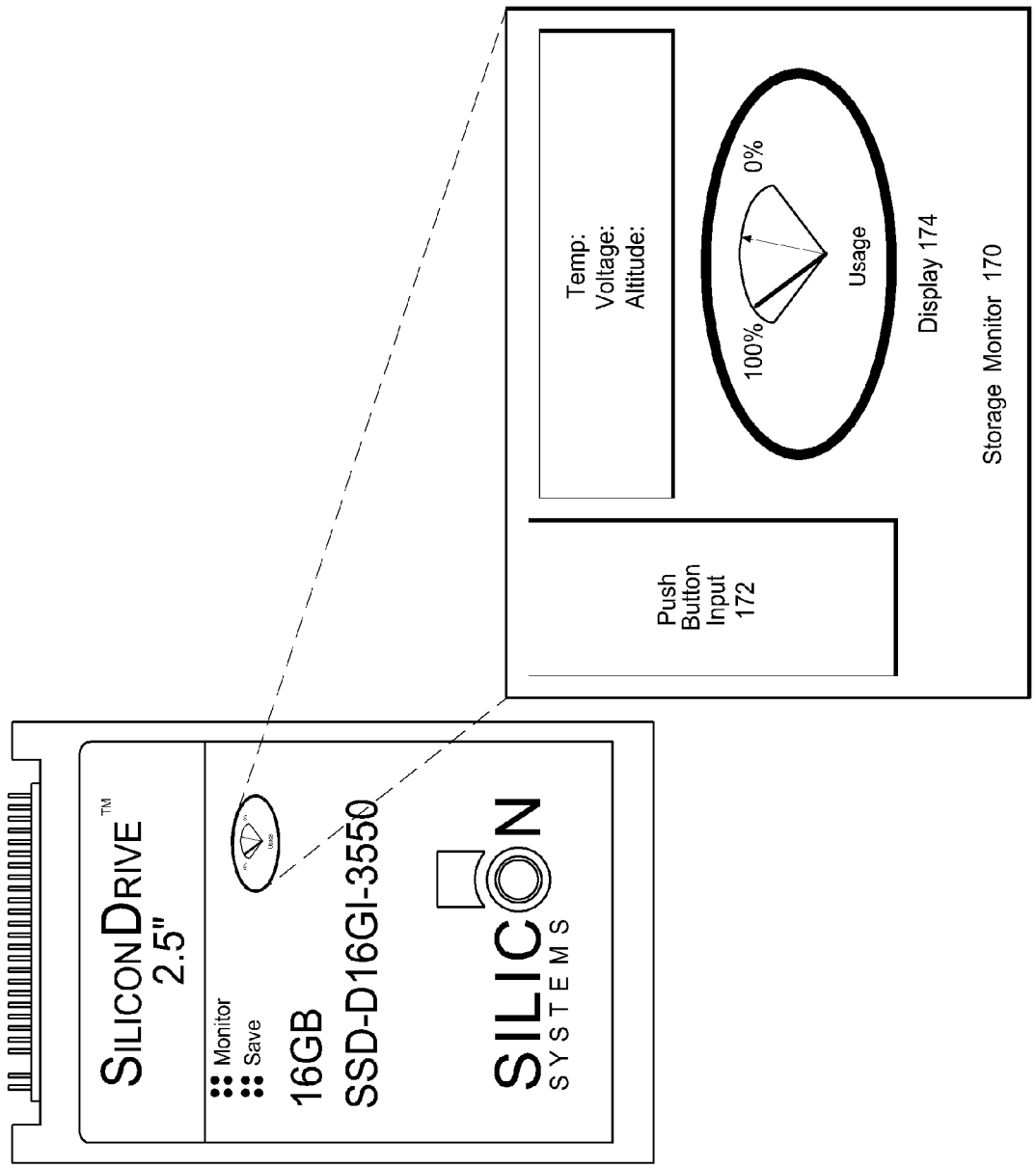
FIG. 11 illustrates how the storage monitor unit of FIG. 10 may be integrated within the housing of the storage subsystem in one embodiment.

FIG. 10 shows an embodiment in which a storage subsystem outputs monitor data to a storage monitoring device 170. In this embodiment, monitor data can be viewed by users without connecting the software to a host system. The storage subsystem 112 is adapted to interface directly with the storage monitor 170. FIG. 11 shows an embodiment in which the storage subsystem 112 has an embedded hardware interface that allows a storage monitor 170 to be plugged in directly to the storage subsystem. In another embodiment, the storage monitor system 170 is embedded into the storage subsystem 112.

In one embodiment, the storage monitor system 170 comprises a monitor data receiving engine 144 that receives monitor data from transmission engine 124 in subsystem 112 as discussed above. In another embodiment, the storage monitor system 170 further comprises a push button interface 172 and a display 174. The display 174 displays monitor data such as temperature, operating voltage, and/or usage statistic as shown in FIG. 2C. In another embodiment, the push button interface 172 comprises a plurality of buttons by which a user can control the display and input custom commands to be issued back to the storage subsystem 112. The display can be provided in addition to, or as an alternative, to the circuitry from transferring the monitor data to the host. In one embodiment, the combined storage device and storage monitor shown in FIG. 11 is implemented in a PC card form factor.

Several of the processes described above may be embodied in, and fully automated via, software code modules executed by one or more general purpose computers. For example, the host application 138 and the monitor application 142 may be embodied in software code modules. The code modules may be stored in any type of computer-readable medium or other computer storage device. Some or all of the methods may alternatively be embodied in specialized computer hardware.

As will be apparent, the features and attributes of the specific embodiments disclosed above may be combined in different ways to form additional embodiments, all of which fall within the scope of the present disclosure.

Although this invention has been described in terms of certain preferred embodiments and applications, other embodiments that are apparent to those of ordinary skill in the art, including embodiments which do not provide all of the features and advantages set forth herein, are also within the scope of this invention. Accordingly, the scope of the present invention is intended to be defined only by reference to the appended claims, which are intended to be construed without reference to the incorporated-by-reference materials.

What is claimed is:

1. A solid state storage subsystem, comprising:
    an array of non-volatile solid state memory; and
    data interface circuitry, comprising:
        a data connector configured to connect the storage subsystem to a host system, the data connector having a form factor accommodating a number of signal lines of a first standardized data transfer interface;
        a controller that:
            accesses the array of non-volatile solid state memory in response to commands received from the host system via a second standardized data transfer interface that has fewer signal lines than the first standardized data transfer interface, wherein a first subset of the signal lines of the data connector are used to implement the second standardized data transfer interface; and
            transmits user data from the array of non-volatile solid state memory to the host system through the second standardized data transfer interface;
            wherein the controller is configured to maintain monitor data of the array of non-volatile solid state memory; and
        a monitor data transmission engine configured to send the monitor data to the host system via a second subset of said signal lines of the same data connector, the second subset being distinct from the first subset.

2. The solid state storage subsystem of claim 1 wherein the first standardized data transfer interface is CompactFlash.

3. The solid state storage subsystem of claim 1 wherein the monitor data transmission engine further comprises a buffer configured to receive and store the monitor data.

4. The solid state storage subsystem of claim 1 further comprises a display wherein the monitor data is received from the monitor data transmission engine and displayed.

5. The solid state storage subsystem of claim 1 wherein the monitor data comprises usage statistics of the array of non-volatile solid state memory.

6. The solid state storage subsystem of claim 1 further comprises a plurality of sensors, wherein the monitor data comprises measurements from a sensor of the plurality of sensors, the sensor being configured to monitor the non-volatile solid state memory.

7. The solid state storage subsystem of claim 1 wherein the monitor data transmission engine is implemented in a Field Programmable Gate Array.

8. The solid state storage subsystem of claim 1 wherein the monitor data transmission engine is implemented in an Application-Specific Integrated Circuit.

9. The solid state storage subsystem of claim 1 wherein the second subset of said signal lines are used to implement a SPI interface.

10. The solid state storage subsystem of claim 1 wherein the second subset of said signal lines are used to implement a RS-232 interface.

11. The solid state storage subsystem of claim 1 further comprises a display adapted to receive monitor data from the monitor data transmission engine and display the monitor data.

12. The solid state storage subsystem of claim 1 further comprises:
    a monitor data receiving engine configured to receive the monitor data from the monitor data transmission engine; and
    a display configured to receive monitor data from the monitor data receiving engine and display.

13. The solid state storage subsystem of claim 1, wherein the first standardized data transfer interface is CompactFlash and the second standardized data transfer interface is SATA.

14. The solid state storage subsystem of claim 1, wherein the first standardized data transfer interface is CompactFlash and the second standardized data transfer interface is USB.

15. A host system configured to interoperate with a solid state storage subsystem, comprising:
    a memory;
    a data connector configured to connect the host system to the solid state storage subsystem, the data connector having a form factor accommodating a number of signal lines of a first standardized data transfer interface;
    a host executable application stored in the memory wherein the host application is configured to handle read and write operations to the solid state storage subsystem and interface with a solid state storage subsystem with a second standardized data transfer interface that has fewer signal lines than the first standardized data transfer interface, wherein a first subset of the signal lines of the data connector are used to implement the second standardized data transfer interface; and
    a monitor application executable in the memory,
    wherein the monitor application is configured to interact with the solid state storage subsystem and receive a data stream of usage statistics of the solid state storage subsystem via a second subset of said signal lines of the same data connector, the second subset being distinct from the first subset,
    wherein the monitor application does not handle read and write operations.

16. The host system of claim 15, wherein the solid state storage subsystem comprises a monitor data transmission engine configured to send the usage statistics of the solid state storage subsystem to the monitor application of the host system, the monitor data transmission engine being further configured to send the usage statistics with synchronization data to facilitate data transfer between the monitor data transmission engine and the monitor application.

* * * * *